(12) United States Patent
Shuman et al.

(10) Patent No.: US 11,902,867 B2
(45) Date of Patent: *Feb. 13, 2024

(54) SELECTION AND USE OF BACKUP COMMUNICATION MODE FOR VEHICLE-TO-VEHICLE MESSAGING

(71) Applicant: QUALCOMM Incorporated, San Diego, CA (US)

(72) Inventors: Mohammed Ataur Rahman Shuman, San Diego, CA (US); Amit Goel, San Diego, CA (US); Volodimir Slobodyanyuk, San Diego, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,757

(22) Filed: Feb. 14, 2023

(65) Prior Publication Data

US 2023/0199452 A1   Jun. 22, 2023

Related U.S. Application Data

(63) Continuation of application No. 17/451,132, filed on Oct. 15, 2021, now Pat. No. 11,627,447, which is a continuation of application No. 17/196,148, filed on Mar. 9, 2021, now Pat. No. 11,277,724, which is a continuation of application No. 16/677,173, filed on Nov. 7, 2019, now Pat. No. 10,959,074.

(51) Int. Cl.
*H04W 4/46* (2018.01)
*H04B 10/516* (2013.01)
*H04W 24/08* (2009.01)
*H04B 10/038* (2013.01)

(52) U.S. Cl.
CPC ............ *H04W 4/46* (2018.02); *H04B 10/516* (2013.01); *H04W 24/08* (2013.01); *H04B 10/038* (2013.01)

(58) Field of Classification Search
CPC ....... H04W 4/46; H04W 24/08; H04W 4/027; H04W 48/18; H04B 10/516; H04B 10/038; H04B 10/1123
USPC ........................................................ 398/115
See application file for complete search history.

(56) References Cited

U.S. PATENT DOCUMENTS

| | | |
|---|---|---|
| 8,923,147 B2 | 12/2014 | Krishnaswamy et al. |
| 10,841,733 B1 * | 11/2020 | Sailer ................. G01C 21/3685 |
| 10,959,074 B1 | 3/2021 | Shuman et al. |
| 11,277,724 B2 | 3/2022 | Shuman et al. |
| 2007/0252723 A1 * | 11/2007 | Boss ....................... H04L 67/12 340/902 |

(Continued)

*Primary Examiner* — Abbas H Alagheband
(74) *Attorney, Agent, or Firm* — QUALCOMM Incorporated

(57) ABSTRACT

Techniques for determining an alternative communication mode for vehicle-to-vehicle communication at a host vehicle can include monitoring the primary mode of RF communication to ensure it is effectively communicating and, if not, intelligently selecting a backup communication mode comprising one or more other sensors and/or systems of the vehicle. The selection of the backup communication mode may take into account various factors that can affect the various modes of communication from which the backup communication mode is selected.

30 Claims, 6 Drawing Sheets

(56) References Cited

U.S. PATENT DOCUMENTS

| | | | |
|---|---|---|---|
| 2013/0057397 A1* | 3/2013 | Cutler | G08G 1/167 |
| | | | 701/25 |
| 2013/0083679 A1* | 4/2013 | Krishnaswamy | H04L 67/61 |
| | | | 370/252 |
| 2014/0270749 A1* | 9/2014 | Miniscalco | H04B 10/11 |
| | | | 398/5 |
| 2015/0230206 A1* | 8/2015 | Tabet | H04L 5/0041 |
| | | | 370/329 |
| 2016/0129908 A1* | 5/2016 | Harda | B60W 30/146 |
| | | | 701/24 |
| 2018/0132193 A1* | 5/2018 | Misener | H04W 52/383 |
| 2019/0079538 A1* | 3/2019 | Switkes | B60W 50/14 |
| 2019/0098471 A1* | 3/2019 | Rech | G08G 1/22 |
| 2019/0132832 A1* | 5/2019 | Uchiyama | H04W 4/40 |
| 2019/0204853 A1* | 7/2019 | Miller, Jr. | G05D 1/0295 |
| 2019/0206260 A1* | 7/2019 | Pilkington | H04N 5/33 |
| 2019/0208441 A1* | 7/2019 | Wang | H04W 24/10 |
| 2019/0258268 A1* | 8/2019 | MacNeille | G05D 1/0287 |
| 2019/0319723 A1* | 10/2019 | Axmon | H04B 17/309 |
| 2019/0385448 A1* | 12/2019 | Montemurro | G08G 1/087 |
| 2019/0394786 A1* | 12/2019 | Parron | H04L 5/0032 |
| 2020/0019738 A1 | 1/2020 | Butler et al. | |
| 2020/0229209 A1* | 7/2020 | Sorrentino | H04W 72/569 |
| 2020/0235887 A1* | 7/2020 | Hou | H04W 24/02 |
| 2021/0227366 A1 | 7/2021 | Shuman et al. | |
| 2022/0103989 A1 | 3/2022 | Shuman et al. | |

\* cited by examiner

SELECTION AND USE OF BACKUP COMMUNICATION MODE FOR VEHICLE-TO-VEHICLE MESSAGING

RELATED APPLICATIONS

This application is a continuation of U.S. application Ser. No. 17/451,132, filed Oct. 15, 2021, entitled "SELECTION AND USE OF BACKUP COMMUNICATION MODE FOR VEHICLE-TO-VEHICLE MESSAGING", which is a continuation of U.S. application Ser. No. 17/196,148, filed Mar. 9, 2019, now U.S. Pat. No. 11,277,724, issued Mar. 15, 2022, entitled "SELECTION AND USE OF BACKUP COMMUNICATION MODE FOR VEHICLE-TO-VEHICLE MESSAGING", which is a continuation and claims the benefit of U.S. application Ser. No. 16/677,173, filed Nov. 7, 2019, now U.S. Pat. No. 10,959,074, issued Mar. 23, 2021, entitled "SELECTION AND USE OF BACKUP COMMUNICATION MODE FOR VEHICLE-TO-VEHICLE MESSAGING", all of which are assigned to the assignee hereof and incorporated herein by reference in their entirety.

BACKGROUND

The use of wireless radio frequency (RF) communications such as cellular vehicle-to-everything (C-V2X) and/or Dedicated Short Range Communications (DSRC) can be employed by many vehicles, including but not limited to autonomous vehicles and semi-autonomous vehicles (including vehicles with Advanced Driver-Assistance Systems (ADAS)) to send and receive information. This information, which can include information describing features surrounding a vehicle, such as other vehicles, objects, or obstacles, can be used in conjunction with the vehicle's sensors for vehicle maneuver planning. Ultimately, these RF communications may make autonomous and semi-autonomous vehicles more capable, more reliable, and safer.

There can be problems with RF communications, however. A communication breakdown could occur in the RF communications due to a variety of reasons, including certain environmental conditions, wireless channel overload, or RF jamming by a malicious actor. When deprived of reliable RF communications, autonomous vehicles and semi-autonomous vehicles may become far less safe.

BRIEF SUMMARY

Techniques described herein address these and other issues by monitoring the primary mode of RF communication to ensure it is effectively communicating and, if not, intelligently selecting a backup communication mode comprising one or more other sensors and/or systems of the vehicle. The selection of the backup communication mode may take into account various factors that can affect the various modes of communication from which the backup communication mode is selected.

An example method of determining an alternative communication mode for vehicle-to-vehicle communication at a host vehicle, according to the description, comprises monitoring signals of a primary radio frequency (RF) communication mode used by the host vehicle for vehicle-to-vehicle communication, determining, based at least in part on the monitoring, that reliability of communications via the primary RF communication mode has fallen below a threshold level, and responsive to the determining that the reliability of the communications via the primary RF communication mode has fallen below the threshold level, selecting, from a plurality of alternative communication modes, a backup communication mode with which to send a vehicle-to-vehicle message. The selecting the backup communication mode is based at least in part on information affecting a reliability of the backup communication mode, a priority of the vehicle-to-vehicle message, or both. The method further comprises sending, from the host vehicle, the vehicle-to-vehicle message via the backup communication mode.

An example device for determining an alternative communication mode for vehicle-to-vehicle communication at a host vehicle, according to the description, comprises a primary radio frequency (RF) communication mode used by the host vehicle for vehicle-to-vehicle communication a plurality of alternative communication modes, a memory, and a processing unit communicatively coupled with the primary RF communication mode, the plurality of alternative communication modes, and the memory. The processing unit is configured to monitor signals of the primary RF communication mode used by the host vehicle for vehicle-to-vehicle communication, determine, based at least in part on the monitoring, that reliability of communications via the primary RF communication mode has fallen below a threshold level, and responsive to the determining that the reliability of the communications via the primary RF communication mode has fallen below the threshold level, select, from the plurality of alternative communication modes, a backup communication mode with which to send a vehicle-to-vehicle message. The selecting the backup communication mode is based at least in part on information affecting a reliability of the backup communication mode, a priority of the vehicle-to-vehicle message, or both. The processing unit is further configured to send, from the host vehicle, the vehicle-to-vehicle message via the backup communication mode.

Another example device, according to the description, comprises means for monitoring signals of a primary radio frequency (RF) communication mode used by a host vehicle for vehicle-to-vehicle communication, means for determining, based at least in part on the monitoring, that reliability of communications via the primary RF communication mode has fallen below a threshold level, and means for selecting, from a plurality of alternative communication modes and responsive to the determining that the reliability of the communications via the primary RF communication mode has fallen below the threshold level, a backup communication mode with which to send a vehicle-to-vehicle message. The selecting the backup communication mode is based at least in part on information affecting a reliability of the backup communication mode, a priority of the vehicle-to-vehicle message, or both. The device further comprises means for sending, from the host vehicle, the vehicle-to-vehicle message via the backup communication mode.

An example non-transitory computer-readable medium, according to the description, has instructions stored thereby for determining an alternative communication mode for vehicle-to-vehicle communication at a host vehicle. The instructions, when executed by one or more processing units, cause the one or more processing units to monitor signals of a primary radio frequency (RF) communication mode used by the host vehicle for vehicle-to-vehicle communication, determine, based at least in part on the monitoring, that reliability of communications via the primary RF communication mode has fallen below a threshold level, and responsive to the determining that the reliability of the communications via the primary RF communication mode has fallen below the threshold level, select, from a plurality of alternative communication modes, a backup communication mode with which to send a vehicle-to-vehicle message. The selecting the backup communication mode is based at least in part on information affecting a reliability of the backup communication mode, a priority of the vehicle-to-vehicle message, or both. Instructions, when executed by the one or more processing units, further cause the one or more processing units to send, from the host vehicle, the vehicle-to-vehicle message via the backup communication mode.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. When referring to such an element using only the first number, any instance of the element is to be understood (e.g., element 110 in the previous example would refer to elements 110-1, 110-2, and 110-3).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

It is noted that, although only C-V2X and DSRC messaging technologies are mentioned in the embodiments herein, the disclosed techniques are applicable to traffic-related messaging of all types. As used herein, the term "traffic entity" is used to refer to vehicles, infrastructure devices (roadside units (RSUs)), or other systems (e.g., computer servers or the like) used to communicate information (e.g., using C-V2X and/or DSRC messaging) for usage by vehicles and/or infrastructure for vehicle planning and maneuvering and/or traffic management.

Figure 1:
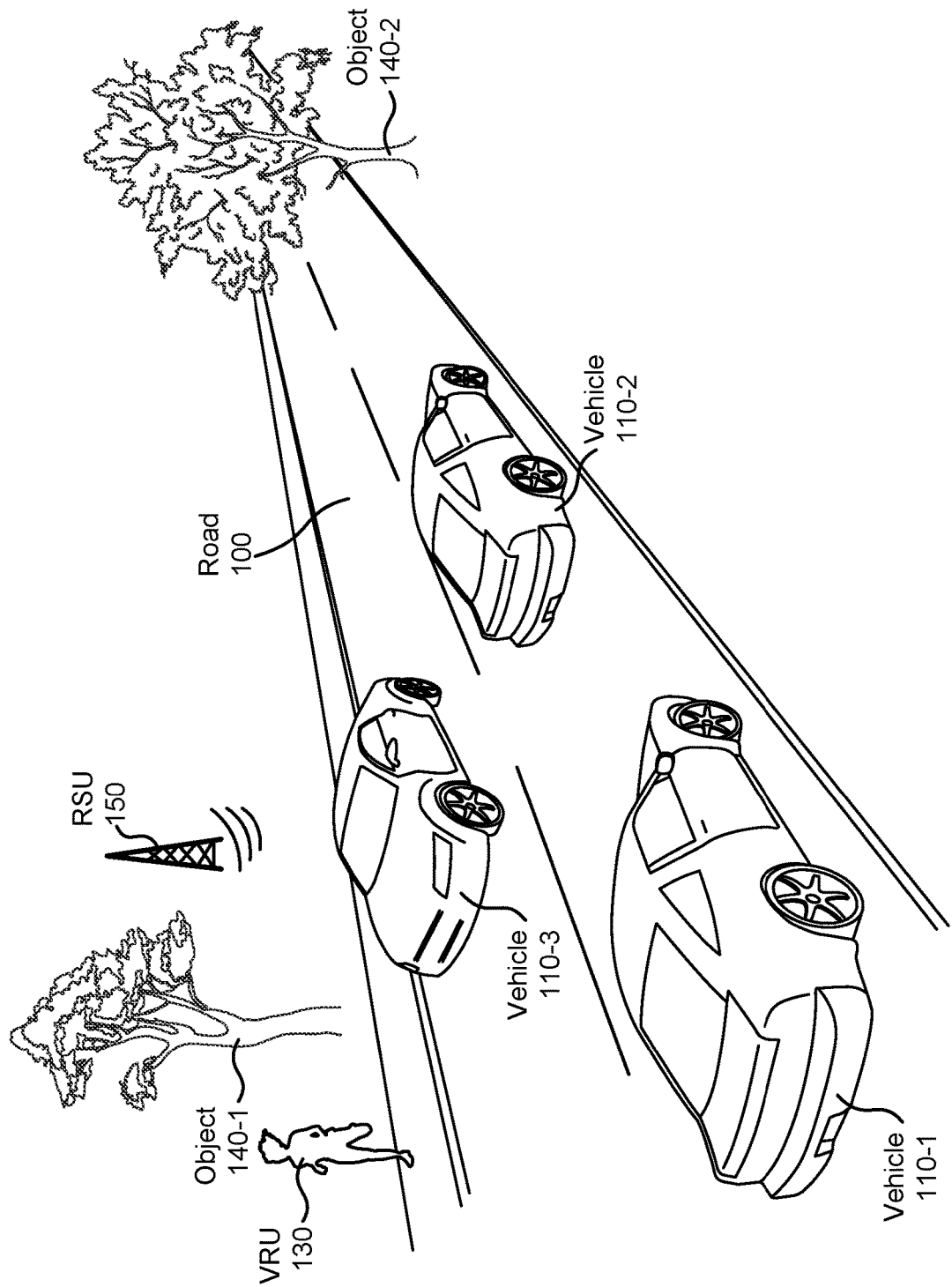
FIG. 1 is a perspective view of a traffic scenario to illustrate how RF communications can be utilized by traffic entities, according to some embodiments.

FIG. 1 is a perspective view of a traffic scenario to illustrate how RF communications can be utilized by various traffic entities, according to some embodiments. Here, the road 100 is shared by vehicles 110-1, 110-2, and 110-3 (collectively and generically referred to as vehicles 110), and a vulnerable road user 130. Near the road 100 are trees (140-1 and 140-2, generically described as objects 140) and an RSU 150. It will be understood, however, that RF communications (such as C-V2X and/or DSRC) can be utilized in any of a variety of other types of traffic scenarios and environments. Moreover, RF communications may be capable of communicating information regarding dynamic and/or static characteristics of vehicles 110, objects off the road 100 (e.g., Vulnerable Road User (VRU) 130 and static objects 140), as well as objects (obstacles) on the road (not illustrated), which may be immobile or mobile, and in addition characteristics of the road. This information may be generated by not only by vehicles 110 (e.g., using various sensors incorporated therein, as described below) but also by non-vehicle entities, such as the VRU 130 and RSU 150. Additionally, traffic management systems may include RSUs 150, which comprise dedicated wireless communication units disposed near the road 100 configured to gather, relay, and otherwise facilitate the communication of information via RF communications. RSUs may also be equipped with sensors to detect vehicles 110, other road users, such as VRUs 130, and road obstacles or objects 140. In addition to gathering and relaying information received from other traffic entities, RSUs 150 may disseminate information gathered from their sensors and/or combine this with information gathered from other road users.

A VRU 130 may comprise any of a variety of entities that share the road 100 with vehicles 110. This can include, for example, pedestrians (e.g., in a pedestrian lane as illustrated in FIG. 1, on a crosswalk, etc.), bicycles, motorcycles, and the like. A VRU 130 may be capable of communicating to a vehicle 110 via RF communications using, for example, a cell phone or other electronic device capable of wireless communications.

As noted, RF communication of traffic-related information can help an autonomous or semi-autonomous vehicle 110 determine a maneuver in countless scenarios. According to some embodiments, RF communication can include both vehicle-to-vehicle (V2V) communications, as well as vehicle-to-infrastructure (V2I) communications. As an example of vehicle-to-vehicle RF communications, a first vehicle 110-1 following a second vehicle 110-2 may receive information from the second vehicle 110-2 indicative of the second vehicle's intent to slow down, resulting in a determination by the first vehicle 110-1 to slow down to provide additional distance between it and the second vehicle 110-2. The information provided by the second vehicle 110-2 may be transmitted prior to the second vehicle 110-2 applying its brakes, and may therefore give the first vehicle 110-1 additional time to react (rather than simply reacting to sensor or other real-time information that indicates the second vehicle 110-2 is slowing down). This can therefore increase the safety of both vehicles as the second vehicle 110-2 applies its brakes.

Generally speaking, the more information provided to a vehicle 110 about its environment via RF communications, the better the vehicle's ability to determine the most appropriate course of action based on its own intent and on received information. The second vehicle 110-2 can provide, for example, information regarding its size, speed, attitude (i.e., orientation in 6 degrees of freedom (6DOF)), intention (e.g., turn, speed up, slow down, etc.), objects it detects (e.g., object 140-2), information it receives via RF communication from other sources (e.g., from a third vehicle 110-3, RSU 150, etc.), and the like. This gives the first vehicle 110-1 much more information than it can gather from its own sensors, giving the automated maneuvering systems of the first vehicle 110-1 a better understanding of the first vehicle's environment, and ultimately allowing the first vehicle 110-1 to make more intelligent maneuvers.

RF communications may utilize cellular and/or other wireless technologies. These technologies can include, for example, Long-Term Evolution (LTE), LTE Advanced, Fifth Generation New Radio (5G NR), Bluetooth®, Wi-Fi and/or other Institute of Electrical and Electronics Engineers (IEEE) 802.11 technologies, ultra-wideband (UWB), and/or other common or proprietary RF communication technologies. A vehicle 110 can use this primary mode of RF communications in accordance with governing standards and protocols to provide other traffic entities with information about the vehicle and its surroundings. In C-V2X, for example, this information is provided in a Basic Safety Message (BSM), which vehicles broadcast regularly via the primary mode of RF communication. However, when this primary mode of RF communication fails (e.g., due to malicious jamming, system overloading, environmental factors, etc.) for particular vehicle, the vehicle may not be able to broadcast a BSM (or equivalent information), thereby making the vehicle, as well as other vehicles and VRUs near the vehicle, less safe.

According to embodiments, this primary mode of RF communication for a vehicle can be monitored to ensure it is effectively communicating. If it is not effectively communicating, other sensors and/or systems of the vehicle can be leveraged to provide backup communication, enabling the vehicle to communicate with nearby traffic entities, and thereby increasing the safety of both the vehicle and the nearby entities.

Figure 2:
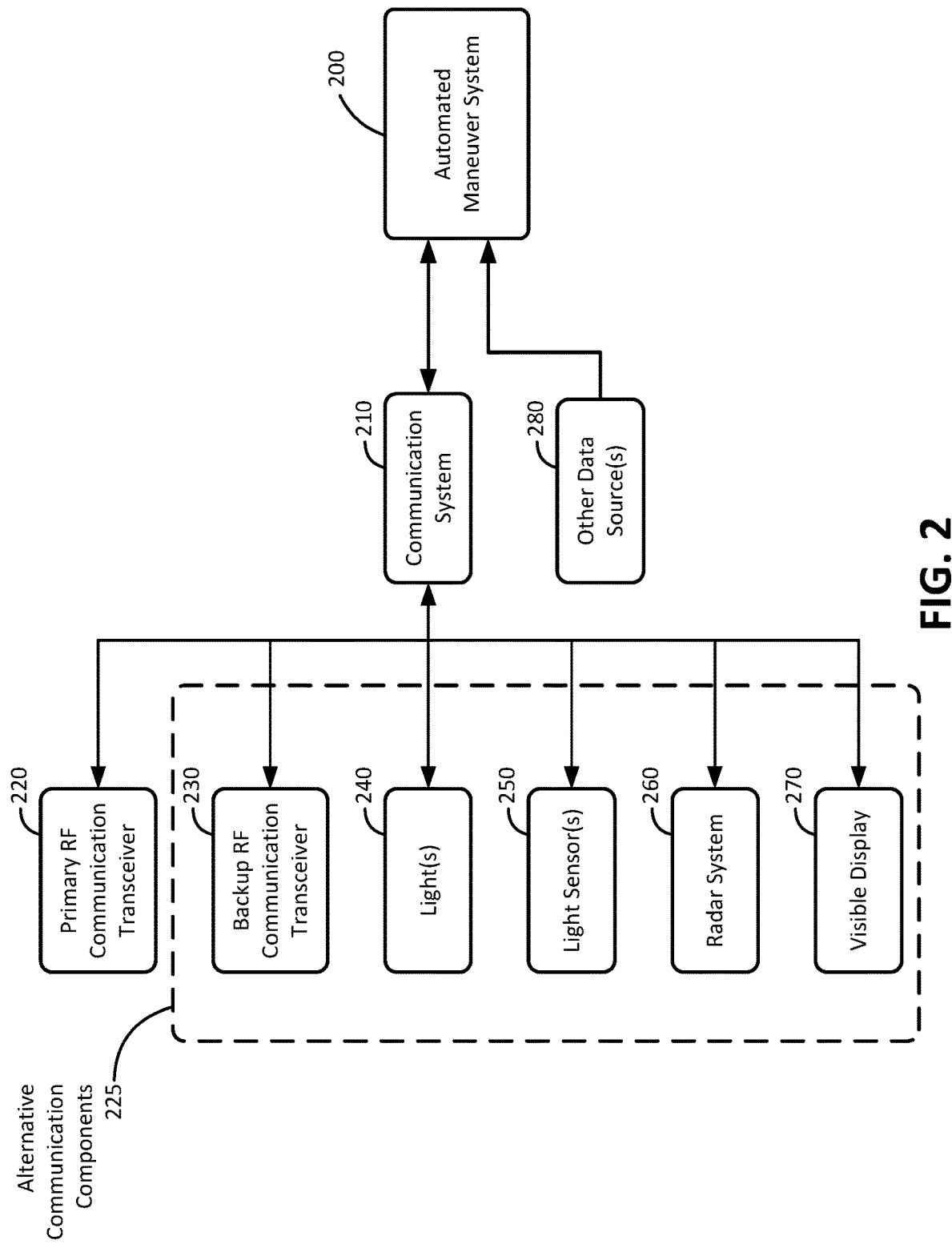
FIG. 2 is a block diagram of relevant communication and automation components of a vehicle, according to an embodiment.

FIG. 2 is a block diagram of communication and automation components of a vehicle, according to an embodiment. Arrows indicate communications links through which data can be sent and/or received. Here, the automated maneuver system 200 may be incorporated into an autonomous or semi-autonomous vehicle 110 for autonomous driving, driver-assist functionality, and/or other vehicle functionality in which autonomous maneuver execution might be utilized. It will be understood that some or all of the various components illustrated may incorporate or be incorporated into hardware and/or software of a computer system (e.g., the mobile computer system 600 of FIG. 6, described in more detail below). A person of ordinary skill in the art will appreciate that alternative embodiments may add, combine, separate, omit, and/or rearrange the components illustrated in FIG. 2. Some vehicles, for example, may have more sensors than those illustrated, while others may have fewer.

Traditional autonomous and semi-autonomous vehicles may include an automated maneuver system capable of gathering information about its surroundings via a communication system (communicatively coupled with a primary RF communication transceiver) and various sensors, and, based on the information, plan and perform driving maneuvers. The communication system may receive information from the automated maneuver system to be able to communicate information regarding the vehicle to nearby vehicle entities (e.g., by broadcasting a BSM).

As shown in FIG. 2, embodiments may comprise an automated maneuver system 200, communication system 210, and primary RF communication transceiver 220. Here, however, embodiments may further include various alternative communication components 225. As illustrated, these alternative communication components 225 may comprise a backup RF communication transceiver 230 and/or other sensors and communication components, such as light(s) 240, light sensor(s) 250, a radar system 260, and/or a visible display 270. According to some embodiments, the alternative communication components 225 may not only serve to provide backup communication (as detailed in the embodiments described herein below), but may also be used in a traditional manner. That is, the light(s) 240 may be used as traditional headlights, taillights, etc.; light sensor(s) 250 (which may include more cameras), may be used for object detection and navigation, the radar system 260 may be used for proximity detection, and the like. That said, according to some embodiments, one or more of the alternative communication components 225 may comprise a unique and/or proprietary component used specifically for alternative communication.

According to embodiments, the automated maneuver system 200 may gather information from the communication system 210 and one or more other data sources 280 to plan and perform driving maneuvers using known techniques. That is, the automated maneuver system 200 may receive information via the communication system 210 from the primary RF communication transceiver 220 (e.g., where the communications comprise vehicle-to-vehicle C-V2X information), as well as from sensors, including the other data source(s) 280 and (according to some embodiments) one or more of the alternative communication components 225. The other data source(s) 280 may comprise, for example, LIDAR, map data, a Global Navigation Satellite Systems (GNSS) receiver, an inertial detection system (e.g., comprising motion sensors, such as gyroscopes, accelerometers, etc.), and the like. The alternative communication components 225 that may provide information to the automated maneuver system 200 can include, for example, the light sensor(s) 250 (e.g., one or more cameras), radar system 260, and backup RF communication transceiver 230. Information from these components may be provided to the automated maneuver system 200 the of the communication system 210 and/or via an alternative communication link (not shown).

According to embodiments, the communication system 210 of the vehicle may be utilized to monitor RF communications via the primary RF communication transceiver 220 and, if the RF communications are determined to be insufficiently reliable (based on the detection of a triggering event as discussed herein below), communicate information regarding the vehicle via one or more of the alternative communication components 225. An example of an embodiment for doing so is illustrated in FIG. 3.

Figure 3:
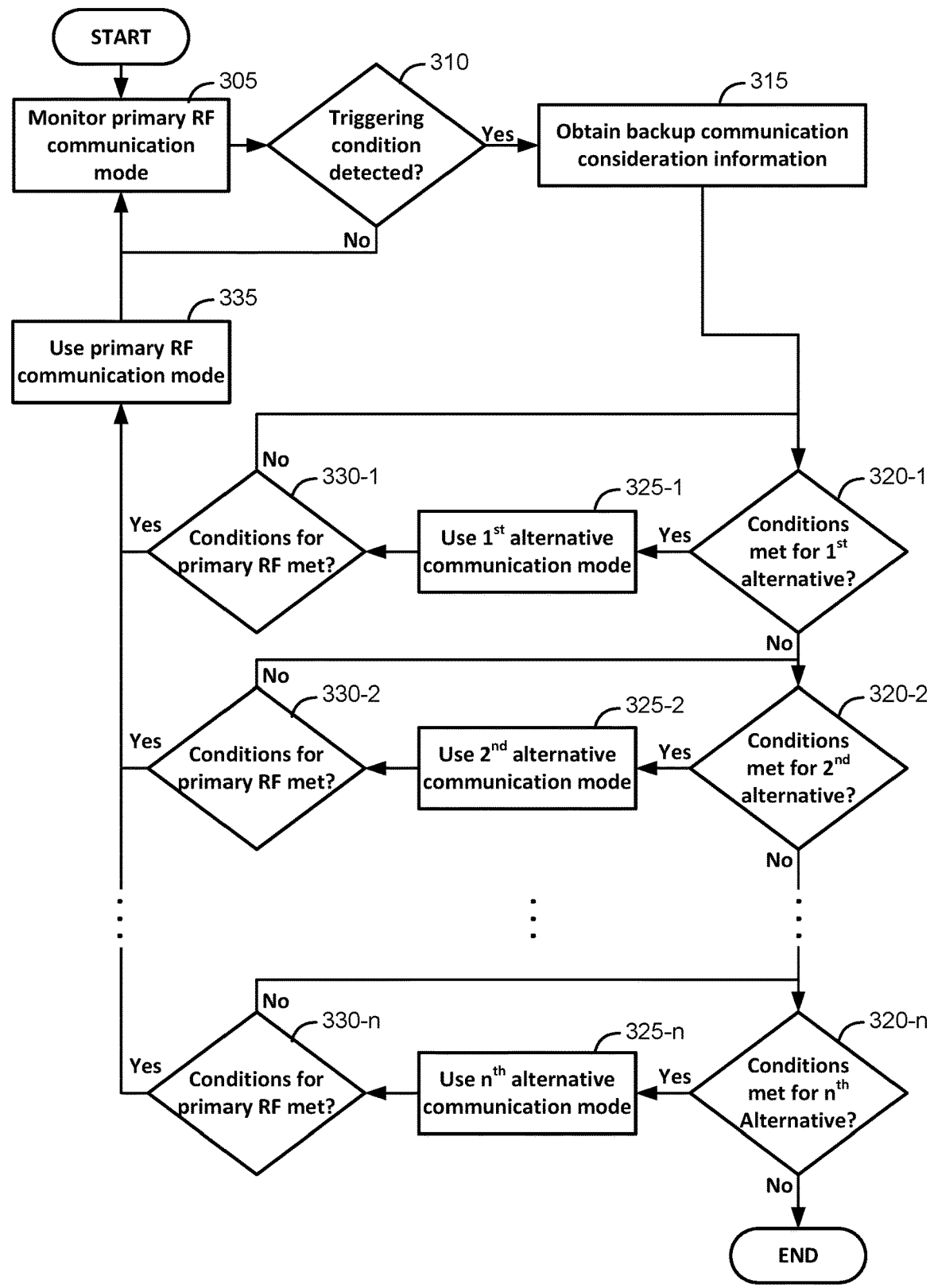
FIG. 3 is a flow chart for determining and alternative communication mode for determining in alternative communication mode for communication at a host vehicle.

FIG. 3 is a flow diagram for determining and alternative communication mode for determining an alternative communication mode for communication at a host vehicle, particularly for vehicle-to-vehicle communications. As used herein, the term "host vehicle" refers to the vehicle sending and receiving RF communications with other traffic entities (other vehicles, RSUs, etc.). This terminology is based on perspective, and can therefore change based on the vehicle being discussed. For example, with reference to it FIG. 1, where the capabilities of a first vehicle 110-1 are being discussed, the first vehicle 110-1 may be referred to as the host vehicle, while vehicle 110-2 and vehicle 110-3 may simply be referred to as "other vehicles." The functions of one or more of the blocks illustrated in FIG. 3 may be performed for example, by a communication system 210 of a host vehicle.

At block 305, the functionality comprises monitoring a primary RF communication mode. That is, RF communications using the primary RF communication transceiver 220 can be monitored to determine whether a triggering condition is detected. And, as illustrated by block 310, this monitoring can continue until a triggering condition is detected.

Here, a "triggering condition" may comprise a condition in which the reliability of communications conducted using the primary RF communication mode is determined to have fallen below a threshold level. This can be based, for example, on one or more metrics used to indicate communication effectiveness, such as error rate of the communications, message throughput and/or rate, failure to acknowledge, and the like. These metrics can be used to determine whether the effectiveness of the primary RF communication type meets a certain threshold. And if not, a triggering condition is detected.

According to some embodiments, the host vehicle may include an additional receiver with an antenna disposed at some distance from an antenna of the primary RF communication transceiver 220. For example, if one or more antennas of the primary RF communication transceiver 220 are located near the front of the host vehicle, the one or more antennas of the additional receiver may be located at the back of the vehicle. This can be used to detect transmissions primary RF communication transceiver 220, to verify that transmissions using the primary RF communication mode are being sent as expected. If the primary RF communication transceiver 220 attempts to transmit a message via RF communications, but the additional receiver does not detect the message, this can signify a triggering condition (e.g., that there is a communication failure by the primary RF communication mode).

According to some embodiments, a triggering condition may be determined from the content of RF communications, in addition or as an alternative to the quality of the RF signals. For example, an additional metric for determining a triggering condition may comprise an awkward, unreliable, or unexpected communication from another vehicle, for which verification using another (secure) mode of communication would be desirable. The receipt of a message telling the host vehicle to accelerates to far beyond the applicable speed limit, for example, could be indicative of a condition in which the host vehicle may want to utilize alternative communication means to verify whether the message was correct.

According to some embodiments, the Channel Busy Ratio (CBR) of an RF communication channel used by the primary RF communication mode can be obtained from the physical layer of the primary RF communication mode and used as a metric for determining whether a triggering condition has occurred. For example, the communication system 210 can monitor the RF communication channel using the primary RF communication mode to determine whether the CBR is at or near (e.g., within a certain threshold) 100% of the available bandwidth for the channel. If so, and if there are only a few other vehicles detected nearby, this can be a triggering condition indicative of a communication failure. Additionally or alternatively, if there is a high density of other vehicles nearby, but a relatively low CBR (e.g., below a lower threshold for an expected CBR, given the traffic density) this can be indicative of a communication failure and used as a metric for determining a triggering condition.

Another metric that can be used for determining whether a triggering condition has occurred, according to some embodiments, may comprise whether communication from another vehicle is detected using one or more of the alternative communication modes (e.g., using communication components 225). If one of the alternative communication modes (e.g., backup RF communication transceiver 230, light sensor(s) 250, or radar 260) receives communications from the another vehicle, this can be indicative of a communication failure by the primary RF communication mode, and may be used as a metric for determining a triggering condition.

Similarly, the metrics used for determining whether a triggering condition has occurred may comprise an inability of the host vehicle to communicate with a particular vehicle nearby. If a transmission from a nearby vehicle (e.g., a BSM broadcast) is expected but not received, this can be indicative of a communication failure with that vehicle and used as a metric for determining a triggering condition.

These and other metrics may be weighted differently, depending on desired functionality. In some embodiments, for example, the detection of one of these metrics alone may comprise a triggering condition. Other embodiments may weight the different metrics differently, and if a combined value of the weighted metrics exceeds a threshold value, a triggering condition is detected. As a person of ordinary skill in the art will appreciate, embodiments may therefore customize the weights of different metrics to emphasize or de-emphasize different metrics in the determination of a triggering condition (that is, whether reliability of communications using the primary communication mode has fallen below a threshold level). If a triggering condition is detected, then the process of FIG. 3 continues to block 315, where backup communication consideration information is obtained.

Figure 4:
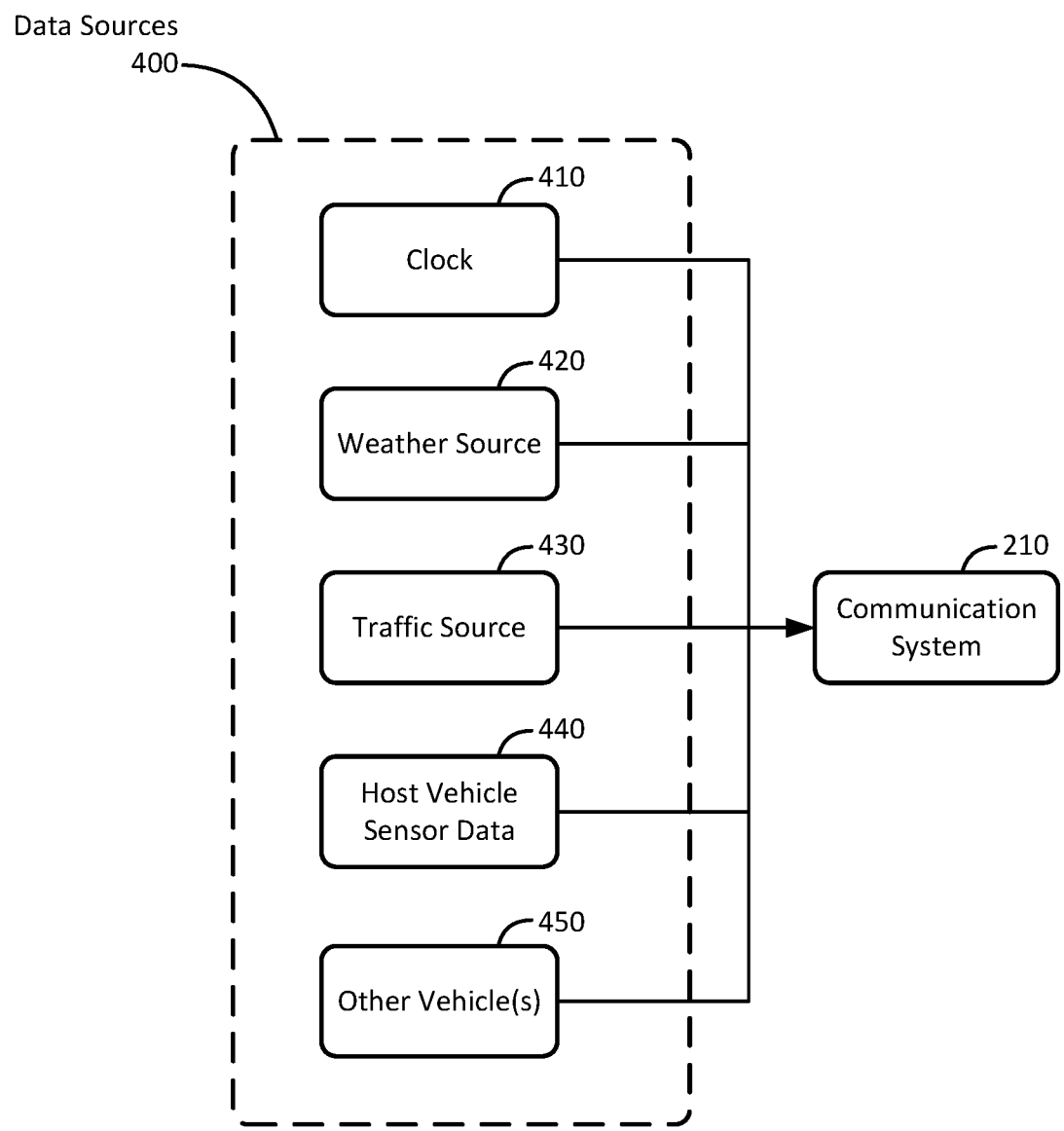
FIG. 4 is a block diagram providing an example of the various data sources that can be used to provide information to the communication system for determination of a backup mode of communication to use, according to an embodiment.

Backup communication consideration information may comprise information regarding any of a variety of considerations that can affect the reliability of one or more of the alternative communication modes, and may therefore be taken into account when choosing the backup communication mode. This information can be provided by a variety of data sources. FIG. 4 provides an example of such sources, according to an embodiment.

FIG. 4 is a block diagram providing an example of the various data sources 400 that can be used to provide information to the communication system 210 for determination of a backup mode of communication to use, according to an embodiment. As with other figures provided herein, FIG. 4 is provided as a non-limiting example. As a person of ordinary skill in the art will appreciate, alternative embodiments may include additional or alternative data sources.

A clock 410 is a data source that can be used to provide the communication system 210 a time of day. Depending on desired functionality, the clock may comprise a system clock for the host vehicle, a GNSS receiver (which may include highly accurate clock information), or the like. Because alternative modes of communication may operate more effectively depending on the time of day, the time of day can be used as a consideration for determining the backup mode of communication. For example, an alternative mode of communication that uses visible light may be less reliable during bright sunlight (e.g., from the mid-morning to mid-evening) then during low sunlight or night time.

Along the same lines, a weather source 420 can be used to provide current weather information to the communication system 210. Similar to the time of day, current weather conditions can make certain forms of communication more reliable than others. Cloudy conditions can make communication using visible light more reliable during daylight hours than sunny conditions. The weather source 420 may comprise, for example, a remote server accessible via the Internet (e.g., by way of cellular or other wireless communication), a weather station broadcasting frequency modulation (FM) signals (received by an FM receiver at the host vehicle), or the like.

A traffic source 430 can be used to provide current traffic information to the communication system 210. Current traffic conditions can make some forms of communication more reliable than others. Traffic conditions indicating dense traffic may suggest that certain forms of alternative communication, e.g. line-of-sight communications, may be limited in distance and/or effectiveness due to traffic density. The similar to the weather source 420, the traffic source 430 may comprise, for example, a remote server accessible via the Internet, a traffic station broadcasting FM signals, or the like.

A host vehicle sensor data 440 can be used to provide current information regarding the host vehicle that may impact the effectiveness of one or more alternative modes of communication. Certain forms of communication, for example, may be less reliable if there is a large differential in the speeds of the host vehicle and another vehicle with which the host vehicle is communicating. Thus, information regarding the speed and attitude of the host vehicle can be obtained from the host vehicle sensor data 440. In some embodiments, the vehicle monitoring system may comprise one or more systems of the host vehicle capable of providing speed, attitude, or other pertinent vehicle information. In some embodiments, the host vehicle sensor data 440 may comprise the automated maneuver system 200.

Other vehicle(s) 450 may provide the communication system 210 with additional information that may be helpful for determining an alternative mode of communication. In particular, other vehicle(s) 450 may provide the communication system 210 with information regarding the their communication capabilities. In some embodiments, for example, these communication capabilities may be provided as part of a BSM or similar message, prior to the breakdown of communications via the primary RF communication mode (e.g., prior to the triggering condition being detected at block 310 of FIG. 3). In some embodiments, the host vehicle may be capable of periodically sending "beacons" using one or more alternative forms of communication, sending communication via the alternative form of communication and awaiting a response from another vehicle. A response from one or more other vehicles 450 to a beacon is indicative of the current capacity of the other vehicle(s) 450 to communicate via the alternative form of communication. According to some embodiments, the host vehicle may cycle through the different alternative forms of communication by sending a beacon (or another message) using each alternative form of communication and awaiting a response.

Referring again to FIG. 3, once the backup communication consideration information is obtained (e.g., from data sources 400) at block 315, the process in FIG. 3 can continue by selecting an alternative mode of communication. As can be seen in FIG. 3, there may be multiple (n) alternative modes of communication, which may be prioritized from first to nth that is, if conditions are not met for using the first alternative communication mode (at block 320-1), then the process can include determining weather conditions are met for the second alternative communication mode (at block 320-2), and so on. In each case, if conditions are met for the respective alternative communication mode, the respective alternative communication mode can then be used (at block 325-1, 325-2, or 325-n) as a backup communication mode.

At blocks 330-1, 330-2, and 330-n (collectively and generically referred to as block 330), the process can include determining weather conditions for using the primary RF communications are met. That is, after using an alternative mode of communication (e.g., after sending a predetermined amount of data, after a predetermined amount of time, etc.) the process can include checking to see whether communications using the primary RF communication mode would be viable. This can include, for example, detecting whether the triggering condition detected at block 310 is still present or not. If conditions are met for using the primary RF communications, the process can then use the primary RF communication transceiver 220 (at block 335) and return to the functionality at block 305 of monitoring the primary RF communications. If the conditions at block 330 are not met, then the process can include checking again to see if conditions for using the respective alternative mode of communication have been met.

Alternative embodiments may transition from one mode of communication to another in different ways. For example, according to some embodiments, if conditions for using the primary RF communications are not met for a lower-priority alternative mode of communication, then the process could include checking to see whether the conditions for a higher-priority alternative mode of communication is met. As a specific example using FIG. 3, if conditions for using the primary RF communications are not met at block 330-n, the process may include checking to see whether conditions are met for using the first alternative modification at block 320-1. Other embodiments may simply resort back to using the primary RF communications (at block 335) without first checking to see whether conditions are met for using the primary RF communications, then checking to see if a triggering condition is again detected at block 310.

The priority and types of alternative communication modes can vary, depending on desired functionality. They can, for example, utilize the alternative communication components 225 illustrated in FIG. 2, and may use the primary RF communication transceiver 220.

One example of an alternative communication mode may comprise using the primary RF communication transceiver 220 in a different way. That is, according to some embodiments, if communications using the primary RF communication transceiver 220 are determined to be ineffective (e.g., if a triggering condition is detected at block 310 of FIG. 3), then communications can be modified such that power for that primary RF communication transceiver 220 exceeds governing specifications and/or standards.

Another alternative communication mode may comprise using the backup communication transceiver 230. This can include using any wireless RF technology communicated by the backup RF indicates transceiver 230, which may be different than the wireless RF technology of the primary RF communication transceiver 220. If, for example, the primary RF communication transceiver 220 communicates via 5G NR, the backup RF dedication transceiver 230 may communicate using Wi-Fi, LTE, UWB, or another wireless technology.

Another alternative communication mode may comprise the use of one or more light(s) 240 and/or light sensor(s) 250. According to some embodiments, the communication system 210 of the host vehicle can cause existing lights (e.g., headlights, taillights, etc.) to be modulated with data to communicate information optically to other vehicles. Light emitting diode (LED) lights, in particular, can be modulated at a high-frequency that is unnoticeable to the human eye.

Additionally or alternatively, embodiments may use lights dedicated for optical communication. These lights may be disposed throughout the host vehicle to allow the host vehicle to transmit optical communications in any of a variety of directions, including in a particular direction (to communicate with a single vehicle or group of vehicles in a single direction) or all directions (effectively broadcasting optical signals in all directions to all nearby traffic entities). In some embodiments the light(s) 240 may use any of a variety of frequency bands for optical communication, including visible, infrared (IR), and/or ultraviolet (UV), and/or may be arranged in spatially-distinguishable arrays to increase optical communication bandwidth with a camera (as discussed in more detail below).

The receiving end, the host vehicle can use light sensor(s) 250 can be used to receive modulated light from other vehicles. Similar to the light(s) 240, embodiments may leverage existing sensors (e.g., cameras) and/or use new sensors dedicated for optical communication. Because light sensors comprising cameras may be limited to a frame rate of the camera, this can limit bandwidth. However, some embodiments may utilize cameras having an adjustable frame rate that allows increasing the frame rate to increase bandwidth during optical communication.

As an additional or alternative means for increasing bandwidth, cameras can be used to receive multiple streams of data from a pixilated optical transmission source. (as described in more detail below with regard to a visible display 270). That is, according to some embodiments, a host vehicle can use a camera to receive multiple optical communication streams at once from a single data source having multiple lights (e.g., a visible display 270 or other light array having light sources arranged in a manner distinguishable by a camera at optical communication ranges).

Additionally or alternatively, embodiments of light sensor(s) 250 may comprise sensors dedicated for optical communication. These light sensor(s) 250 disposed throughout the host vehicle to allow the host vehicle to receive optical communication in any of a variety of directions, including in a particular direction or all directions.

According to some embodiments, a communication system 210 may utilize a visible display 270 to allow a host vehicle to optically transmit information to other vehicles. The visible display 270 may comprise an electronic display, such as a programmable license plate, that may be encoded with a message. In particular, the display may encoded with a barcode, Quick Response (QR) code, 3D code, embossed pattern, or the like, which may be detected by a camera (or other light sensor) of another vehicle. Communicating using the visible display 270 may comprise adjusting the brightness, contrast, and/or refresh rate of the visible display 270 to accommodate certain conditions, such as the lighting, distance of communication, and the like. In addition or as an alternative to the visual patterns, one or more portions of the visible display 270 may be modulated in a manner similar to the previously-described modulation of the light(s) 240.

Another alternative communication mode may comprise the use of a radar system 260. For example, because a radar system 260 is equipped to transmit RF signals for proximity detection, use of the radar system 260 may be modified to operate in a communication mode. In the communication mode, the radar system 260 may transmit data via RF transmissions. It may further receive data via RF transmissions from the radar systems of other vehicles.

According to some embodiments, information communicated by the host vehicle can be modified to accommodate the backup communication mode. That is, for alternative communication modes having a lower bandwidth, power, and/or throughput, the communication system 210 may generate messages having a smaller message size, lower power, lower frequency, etc. For example, BSM message frequency under C-V2X is currently 100 ms, but this frequency can be reduced for LED-to-camera communications, due to the relatively low bandwidth of this mode of alternative communication. Messages sent using a selected alternative (backup) communication mode may further be sent in accordance with applicable governing standards and/or protocols for the backup communication mode.

To detect one another vehicle has entered a backup communication mode, the communication system 210 of the host vehicle may monitor alternative communication receiving components (e.g., backup RF communication transceiver 230, light sensors 250, and radar system 260) to determine whether other vehicles are attempting to communicate using a backup communication mode.

Figure 5:
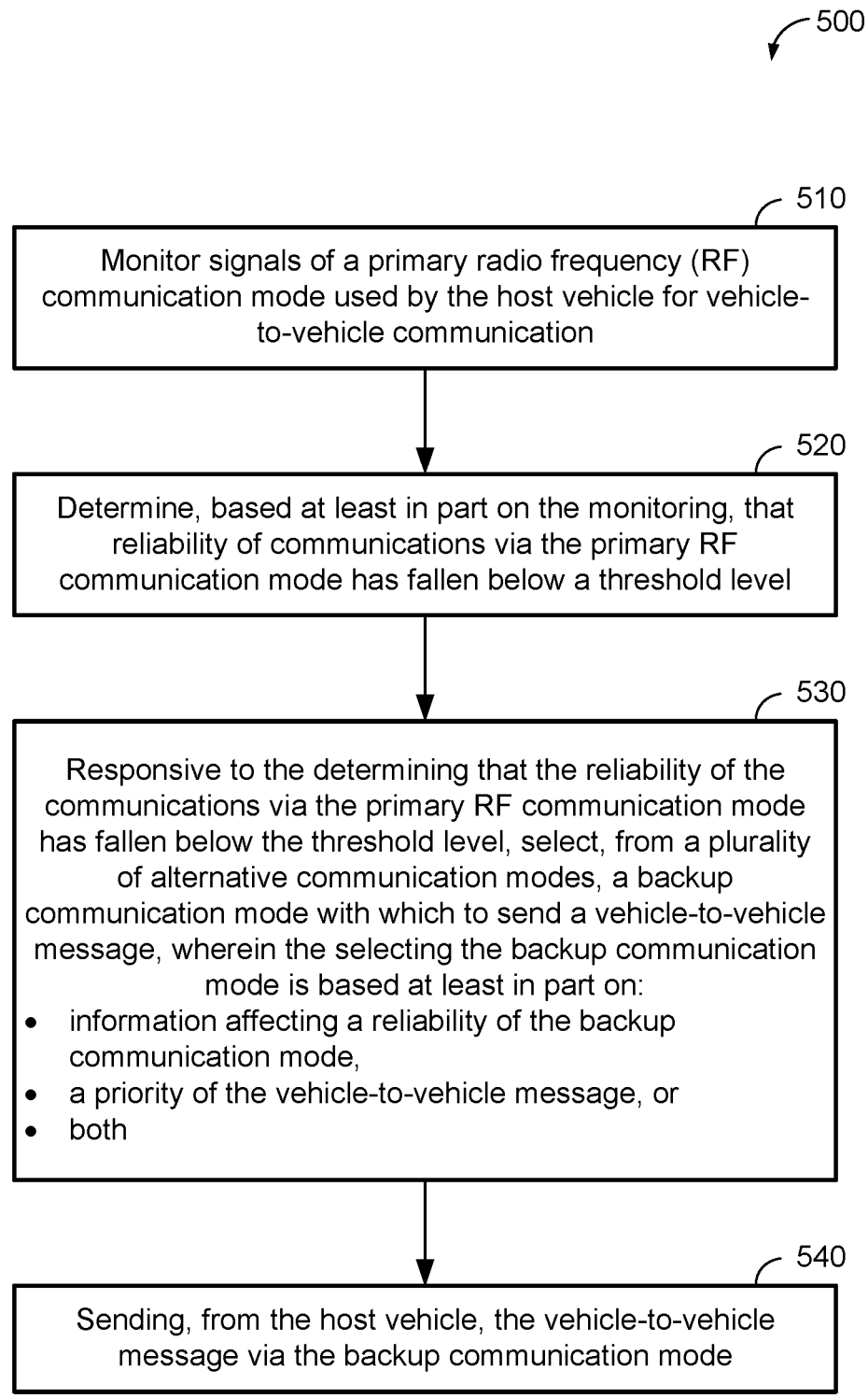
FIG. 5 is a flow diagram of a method of determining an alternative communication mode for vehicle-to-vehicle communication at a host vehicle, according to an embodiment, according to an embodiment.

FIG. 5 is a flow diagram of a method 500 of determining a backup communication mode for vehicle-to-vehicle communication at a host vehicle, according to an embodiment. The method 500 may be seen as an embodiment of implementing the process shown in the flow diagram of FIG. 3. Alternative embodiments may vary in function by combining, separating, or otherwise varying the functionality described in the blocks illustrated in FIG. 5. Means for performing the functionality of one or more of the blocks illustrated in FIG. 5 may comprise hardware and/or software components of a communication system 210, which may include or be implemented as part of a mobile computer system 600 illustrated in FIG. 6 and described in more detail below.

At block 510, the method comprises monitoring signals of a primary RF communication mode used by the host vehicle for vehicle-to-vehicle communication. As noted in the embodiments described above, such monitoring may include monitoring any of a variety of metrics of the reliability of communications via the primary RF communication mode, including error rate, throughput, CBR, receipt of an acknowledgment (ACK) of a transmitted message, and the like. Means for performing the functionality at block 510 may include one or more software and/or hardware components of a computer system, such as a bus 605, processing unit(s) 610, memory 660, wireless communication interface 630, and/or other software and/or hardware components of the mobile computer system 600 illustrated in FIG. 6 and described in more detail below.

At block 520, the functionality comprises determining, based at least in part on the monitoring, that reliability of communications via the primary RF communication mode has fallen below a threshold level. As previously noted, this may comprise determining whether a triggering condition has occurred. Thus, as discussed, this may further comprise determining an error rate of communications via the primary RF communication mode has exceeded an error rate threshold, a rate of communications via the primary RF communication mode has fallen below a throughput threshold, a Channel Busy Ratio (CBR) has exceeded a CBR threshold, and/or determining that an acknowledgment has not been received in response to sending one or more previous messages via the primary RF communication mode. In some embodiments, where the CBR has exceeded a CBR threshold, determining that the reliability of communications via the primary RF communication mode has fallen below a threshold level may further comprise determining that a density of vehicles within the threshold distance of the host vehicle is not proportional to the determined CBR.

Means for performing the functionality at block 520 may include one or more software and/or hardware components of a computer system, such as a bus 605, processing unit(s) 610, memory 660, and/or other software and/or hardware components of the mobile computer system 600 illustrated in FIG. 6 and described in more detail below.

At block 530, the functionality comprises, responsive to the determining that the reliability of the communications via the primary RF communication mode has fallen below a threshold level, selecting from a plurality of alternative communication modes, a backup communication mode with which to send a vehicle-to-vehicle message. The selecting the backup communication mode is based at least in part on information affecting the reliability of the alternative communication mode, a priority of the vehicle-to-vehicle message, or both. As previously noted, the backup communication mode may be selected based on information pertaining to the reliability of the backup communication mode, as described above with relation to FIG. 4. Additionally or alternatively, a high-priority message, for example may be sent using one or more alternative communication modes, and may be independent of information affecting the reliability of the backup communication mode. Thus, according to some embodiments of the method 500, selecting the backup communication mode may be based at least in part on determining the vehicle-to-vehicle message has a high priority.

In some embodiments, priority may be explicit (e.g., included in a priority field of a message) or implicit (e.g., based on the type of message). As an example, event-based BSM messages may be considered higher-priority than periodic BSM messages. In the case of a heartbreaking vehicle, for instance, the vehicle may send an event-based BSM (e.g., a BSM message with an event) immediately to let nearby vehicles know about the event.

As noted in the embodiments above, information affecting the reliability of the backup communication mode may comprise information regarding a time of day, a weather condition, a traffic condition, a relative speed between the host vehicle and another vehicle, or capacity of another vehicle to communicate using the backup communication mode, or any combination thereof. This information affecting the reliability of the backup communication mode may comprise data from one or more sensors of the host vehicle Means for performing the functionality at block 530 may include one or more software and/or hardware components of a computer system, such as a bus 605, processing unit(s) 610, memory 660, and/or other software and/or hardware components of the mobile computer system 600 illustrated in FIG. 6 and described in more detail below.

At block 540, the functionality comprises sending, from the host vehicle, the vehicle-to-vehicle message via the backup communication mode. As detailed in the previously-described embodiments, this may comprise utilizing one or more of a backup RF communication transceiver, light, light sensor, a radar system, a visible display, or any combination thereof. In some embodiments, the backup communication mode may comprise optical communication, which may include modulated light, patterned light, or both, which may include visible, IR, and/or UV light. Moreover, a primary RF communication transceiver may be used in addition to the backup communication mode (and, in some embodiments, may be used in a high-power or emergency mode). As such, in some embodiments, the method may further comprise sending the vehicle-to-vehicle message from the host vehicle is via the primary RF communication mode.

Figure 6:
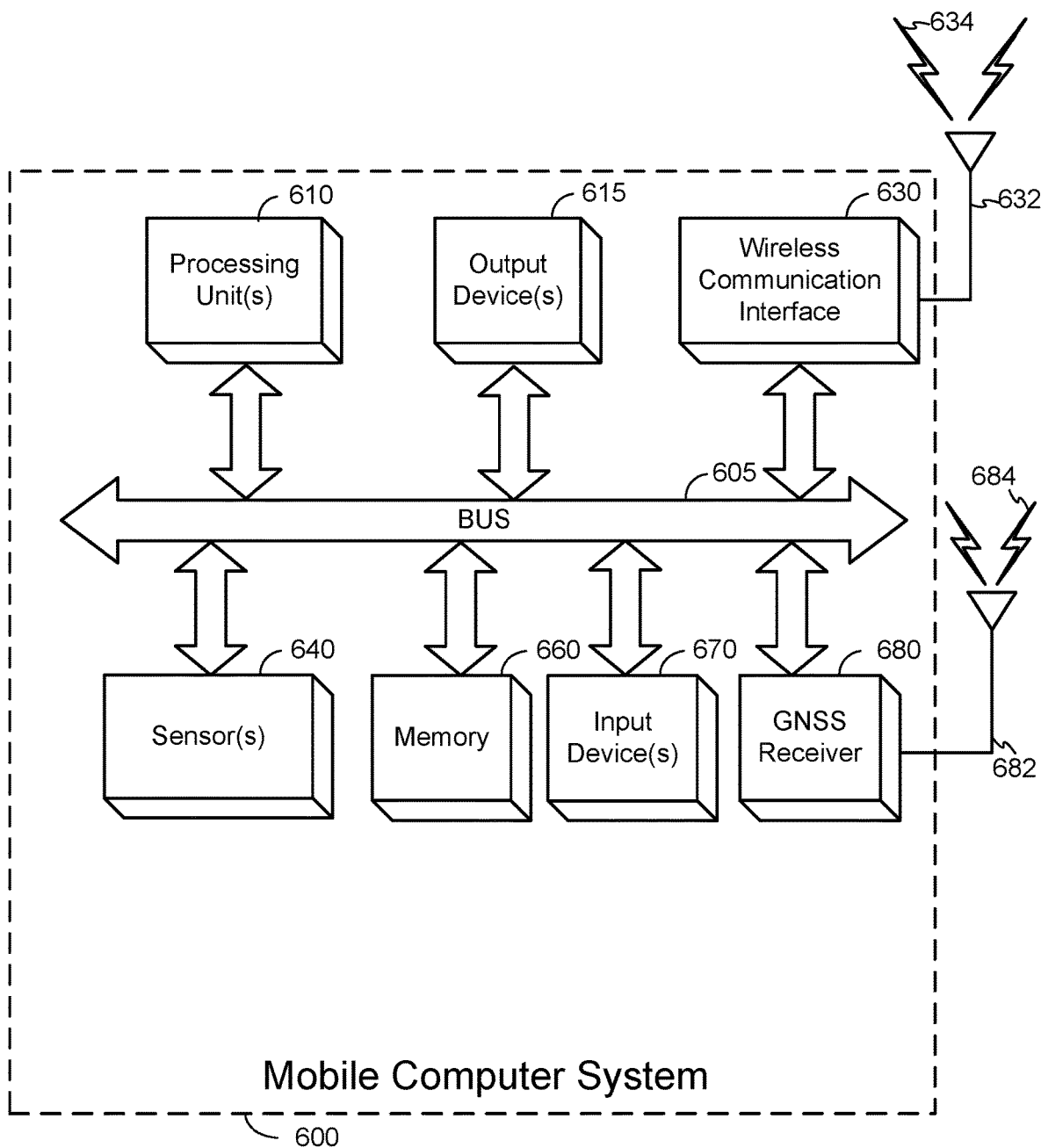
FIG. 6 is a block diagram of an embodiment of a mobile computer system.

FIG. 6 illustrates an embodiment of a mobile computer system 600, which may be disposed on a vehicle and may incorporate and/or be incorporated into the communication system 210 and/or other communication and automation components of a vehicle illustrated in FIG. 2. For example, the mobile computer system 600 can perform one or more of the functions of method 500 of FIG. 5. It should be noted that FIG. 6 is meant only to provide a generalized illustration of various components, any or all of which may be utilized as appropriate. It can be noted that, in some instances, components illustrated by FIG. 6 can be localized to a single physical device and/or distributed among various networked devices, which may be disposed at different physical locations on a vehicle.

The mobile computer system 600 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as digital signal processing (DSP) chips, graphics acceleration processors, application specific integrated circuits (ASICs), and/or the like), and/or other processing structure or means. As indicated in the previously-detailed embodiments alternative communication mode selection and/or other functions may be performed by the processing unit(s) 610, based on information from the wireless communication interface 630 and/or sensor(s) 640. The mobile computer system 600 also can include one or more input devices 670, which can include without limitation user interface devices (e.g., a touch screen, a touch pad, microphone, button(s), dial(s), switch(es), and/or the like), vehicle systems (e.g., automated maneuver system 200 and/or other vehicle control systems), and the like. The mobile computer system 600 also can include one or more output devices 615, which can include without limitation user interface devices (display, light emitting diode (LED), speakers, and/or the like), vehicle maneuver and/or control systems, and the like.

The mobile computer system 600 may also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, a WAN device and/or various cellular devices, etc.), and/or the like, which may enable the mobile computer system 600 to perform vehicle-to-vehicle (V2V) communication and other communication (e.g., vehicle-to-infrastructure (V2I) communication, communication with a data network, etc.) as described herein. The communication can be carried out via one or more wireless communication antenna(s) 632 that send and/or receive wireless signals 634.

Depending on desired functionality, the wireless communication interface 630 may comprise separate transceivers to communicate with base stations and other terrestrial transceivers, such as wireless devices and access points. The mobile computer system 600 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as CDMA2000, Wideband CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile computer system 600 can further include sensor(s) 640. Sensors 640 may comprise on or more components capable of providing the host vehicle sensor data 440 as described in the embodiments herein. This may include the sensors of the alternative communication components 225 and/or other data source(s) 280 in FIG. 2. More generally, sensor(s) 640 may include, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances.

Embodiments of the mobile computer system 600 may also include a GNSS receiver 680 capable of receiving signals 684 from one or more GNSS satellites using an antenna 682. As noted, the GNSS receiver 680 may be included in the other data source(s) 280 of FIG. 2, and can be utilized by the automated maneuver system to plan and perform vehicle maneuvers. The GNSS receiver 680 can extract a position of the mobile computer system 600 using conventional techniques satellite data of a GNSS system, such as Global Positioning System (GPS), Galileo, Global Navigation Satellite System (GLONASS), Quasi-Zenith Satellite System (QZSS) over Japan, Indian Regional Navigational Satellite System (IRNSS) over India, Beidou over China, and/or the like. Moreover, the GNSS receiver 680 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

The mobile computer system 600 may further include and/or be in communication with a memory 660. The memory 660 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 660 of the mobile computer system 600 also can comprise software elements (not shown in FIG. 6), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 660 that are executable by the mobile computer system 600 (and/or processing unit(s) 610 within mobile computer system 600). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable programmable ROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, because technology evolves, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of determining an alternative communication mode for vehicle-to-vehicle communication at a host vehicle, the method comprising:
    monitoring signals of a primary radio frequency (RF) communication mode used by the host vehicle for vehicle-to-vehicle communication;
    determining, based at least in part on the monitoring, that a density of vehicles has exceeded a threshold density value;
    responsive to the determining that the density of vehicles has exceeded the threshold density value, selecting, from one or more alternative communication modes alternative to the primary RF communication mode, a second RF communication mode with which to send a vehicle-to-vehicle message; and
    sending, from the host vehicle, the vehicle-to-vehicle message via the second RF communication mode.

2. The method of claim 1, wherein the selecting the second RF communication mode is based at least in part on:
    information affecting a reliability of the second RF communication mode,
    a priority of the vehicle-to-vehicle message, or
    both.

3. The method of claim 2, further comprising determining the priority of the vehicle-to-vehicle message based on a determination that the vehicle-to-vehicle message comprises an event-based Basic Safety Message (BSM).

4. The method of claim 1, wherein the second RF communication mode comprises using a different transceiver than a transceiver of the primary RF communication mode.

5. The method of claim 1, wherein the second RF communication mode comprises:
    cellular mobile communication,
    Wi-Fi, or
    Ultra-Wideband (UWB), or
    any combination thereof.

6. The method of claim 1, wherein the selecting the second RF communication mode is further based at least in part determining that a reliability of communications via the primary RF communication mode has fallen below a threshold level of reliability.

7. The method of claim 6, wherein determining that a reliability of the communications via the primary RF communication mode has fallen below the threshold level of reliability comprises determining:
    an error rate of communications via the primary RF communication mode has exceeded an error rate threshold,
    a rate of communications via the primary RF communication mode has fallen below a throughput threshold,
    a Channel Busy Ratio (CBR) has exceeded a CBR threshold, or
    a rate of messages received via the primary RF communication mode has fallen below a threshold rate, or
    any combination thereof.

8. The method of claim 7, wherein the determining that the reliability of the communications via the primary RF communication mode has fallen below the threshold level of reliability comprises determining the CBR has exceeded the CBR threshold, and further comprises:
    determining that the density of vehicles is not proportional to the determined CBR.

9. The method of claim 1, further comprising sending, from the host vehicle, the vehicle-to-vehicle message via the primary RF communication mode.

10. A device for determining an alternative communication mode for vehicle-to-vehicle communication at a host vehicle, the device comprising:
    a first transceiver configured to be used in a primary radio frequency (RF) communication mode by the host vehicle for vehicle-to-vehicle communication;
    a second transceiver configured to be used in one or more alternative communication modes alternative to the primary RF communication mode;
    a memory; and
    a processing unit communicatively coupled with the first transceiver, the second transceiver, and the memory, wherein the processing unit is configured to:
        monitor signals of the primary RF communication mode used by the host vehicle for vehicle-to-vehicle communication;
        determine, based at least in part on the monitoring, that a density of vehicles has exceeded a threshold density value;
        responsive to the determining that the density of vehicles has exceeded the threshold density value, select, from one or more alternative communication modes alternative to the primary RF communication mode, a second RF communication mode with which to send a vehicle-to-vehicle message; and
        send, from the host vehicle, the vehicle-to-vehicle message via the second RF communication mode using the second transceiver.

11. The device of claim 10, wherein the processing unit is configured to select the second RF communication mode is based at least in part on:
 information affecting a reliability of the second RF communication mode,
 a priority of the vehicle-to-vehicle message, or
 both.

12. The device of claim 11, wherein the processing unit is further configured to determine the priority of the vehicle-to-vehicle message based on a determination that the vehicle-to-vehicle message comprises an event-based Basic Safety Message (BSM).

13. The device of claim 10, wherein the second RF communication mode comprises:
 cellular mobile communication,
 Wi-Fi, or
 Ultra-Wideband (UWB), or
 any combination thereof.

14. The device of claim 10, wherein the processing unit is configured to select the second RF communication mode further based at least in part determining that a reliability of communications via the primary RF communication mode has fallen below a threshold level of reliability.

15. The device of claim 14, wherein, to determine that a reliability of the communications via the primary RF communication mode has fallen below the threshold level of reliability, the processing unit is configured to determine:
 an error rate of communications via the primary RF communication mode has exceeded an error rate threshold,
 a rate of communications via the primary RF communication mode has fallen below a throughput threshold,
 a Channel Busy Ratio (CBR) has exceeded a CBR threshold, or
 a rate of messages received via the primary RF communication mode has fallen below a threshold rate, or
 any combination thereof.

16. The device of claim 15, wherein, to determine that the reliability of the communications via the primary RF communication mode has fallen below the threshold level of reliability, the processing unit is configured to determine the CBR has exceeded the CBR threshold, and the density of vehicles is not proportional to the determined CBR.

17. The device of claim 10, wherein the processing unit is further configured to send, from the host vehicle, the vehicle-to-vehicle message via the primary RF communication mode.

18. An apparatus for determining an alternative communication mode for vehicle-to-vehicle communication at a host vehicle, the apparatus comprising:
 means for monitoring signals of a primary radio frequency (RF) communication mode used by the host vehicle for vehicle-to-vehicle communication;
 means for determining, based at least in part on the monitoring, that a density of vehicles has exceeded a threshold density value;
 means for, responsive to the determining that the density of vehicles has exceeded the threshold density value, selecting, from one or more alternative communication modes alternative to the primary RF communication mode, a second RF communication mode with which to send a vehicle-to-vehicle message; and
 means for sending, from the host vehicle, the vehicle-to-vehicle message via the second RF communication mode.

19. The apparatus of claim 18, further comprising means for determining a priority of the vehicle-to-vehicle message based on a determination that the vehicle-to-vehicle message comprises an event-based Basic Safety Message (BSM).

20. The apparatus of claim 18, further comprising means for using a different transceiver than a transceiver of the primary RF communication mode.

21. The apparatus of claim 18, wherein the second RF communication mode comprises:
 cellular mobile communication,
 Wi-Fi, or
 Ultra-Wideband (UWB), or
 any combination thereof.

22. The apparatus of claim 18, wherein the means for selecting the second RF communication mode comprise means for determining that a reliability of communications via the primary RF communication mode has fallen below a threshold level of reliability.

23. The apparatus of claim 22, wherein the means for determining that a reliability of the communications via the primary RF communication mode has fallen below the threshold level of reliability comprises:
 means for determining an error rate of communications via the primary RF communication mode has exceeded an error rate threshold,
 means for determining a rate of communications via the primary RF communication mode has fallen below a throughput threshold,
 means for determining a Channel Busy Ratio (CBR) has exceeded a CBR threshold, or
 means for determining a rate of messages received via the primary RF communication mode has fallen below a threshold rate, or
 any combination thereof.

24. The apparatus of claim 23, further comprising the means for determining the CBR has exceeded the CBR threshold, and means for determining that the density of vehicles is not proportional to a determined CBR.

25. The apparatus of claim 18, further comprising means for sending, from the host vehicle, the vehicle-to-vehicle message via the primary RF communication mode.

26. A non-transitory computer-readable medium storing instructions for determining an alternative communication mode for vehicle-to-vehicle communication at a host vehicle, the instructions comprising code for:
 monitoring signals of the primary RF communication mode used by the host vehicle for vehicle-to-vehicle communication;
 determining, based at least in part on the monitoring, that a density of vehicles has exceeded a threshold density value;
 responsive to the determining that the density of vehicles has exceeded the threshold density value, selecting, from one or more alternative communication modes alternative to the primary RF communication mode, a second RF communication mode with which to send a vehicle-to-vehicle message; and
 sending, from the host vehicle, the vehicle-to-vehicle message via the second RF communication mode.

27. The computer-readable medium of claim 26, wherein the selecting the second RF communication mode is based at least in part on:
 information affecting a reliability of the second RF communication mode,
 a priority of the vehicle-to-vehicle message, or
 both.

28. The computer-readable medium of claim 27, wherein the instructions further comprise code for determining the priority of the vehicle-to-vehicle message based on a determination that the vehicle-to-vehicle message comprises an event-based Basic Safety Message (BSM).

29. The computer-readable medium of claim 26, wherein the selecting the second RF communication mode is further based at least in part determining that a reliability of communications via the primary RF communication mode has fallen below a threshold level of reliability.

30. The computer-readable medium of claim 29, wherein the code for determining that a reliability of the communications via the primary RF communication mode has fallen below the threshold level of reliability comprises code for determining:
- an error rate of communications via the primary RF communication mode has exceeded an error rate threshold,
- a rate of communications via the primary RF communication mode has fallen below a throughput threshold,
- a Channel Busy Ratio (CBR) has exceeded a CBR threshold, or
- a rate of messages received via the primary RF communication mode has fallen below a threshold rate, or
any combination thereof.

\* \* \* \* \*